United States Patent [19]

Weis

[11] 4,079,900
[45] Mar. 21, 1978

[54] DRIVING SYSTEM FOR MINIATURE DICTATING MACHINES

[75] Inventor: Karl Weis, Bad Homburg, Germany

[73] Assignee: Assmann G.m.b.H., Germany

[21] Appl. No.: 717,150

[22] Filed: Aug. 24, 1976

[30] Foreign Application Priority Data

Aug. 27, 1975 Germany .............................. 2538068

[51] Int. Cl.² .......................... G03B 1/04; G11B 15/32
[52] U.S. Cl. ........................................ 242/201; 74/207
[58] Field of Search ............... 242/200, 201, 204, 205; 74/207

[56] References Cited

U.S. PATENT DOCUMENTS 3,417,936  12/1968  Paape .................................... 242/201
3,643,894  2/1972  Kadowaki ........................... 242/201

Primary Examiner—Leonard D. Christian

Attorney, Agent, or Firm—Lane, Aitken, Dunner & Ziems

[57] ABSTRACT

A driving system for miniature dictating apparatus with winding drive means comprises a rewinding means and a forward winding means for receiving tape windings, and a motor, the shaft of which is arranged in a plane substantially perpendicular to the shafts of the rewinding and forward winding means. The driving system also includes an intermediate shaft which is driven by the motor and is positioned parallel to the rewinding shaft and the forward winding. The intermediate shaft is mounted to be parallel displaceable and is adapted to be set in at least one forward running position and a rewind position. In the forward running position only the shaft of the forward winding means and in the rewind position only the shaft of the rewinding means are adapted to be driven by means of the intermediate shaft.

13 Claims, 3 Drawing Figures

[4,079,900]

DRIVING SYSTEM FOR MINIATURE DICTATING MACHINES

BACKGROUND OF THE INVENTION

The invention relates to a driving system for miniature dictating machines with winding drive, comprising a rewinding shaft and a forward winding shaft for receiving tape windings, and a motor with its drive shaft arranged in a plane substantially perpendicular to the rewinding and forward winding shafts.

Such driving systems for miniature dictating machines must be as compact as possible thereby defining the outer dimensions of the miniature dictating machine. On the other hand, the efficiency of the driving systems of miniature dictating machines must be as high as possible, i.e., the transmission losses must be as small as possible to achieve by the available energy source, e.g. a battery of limited capacity, a performance as long as possible. Furthermore, the starting torques for the different modes of operation of such miniature dictating machines, e.g. slow and fast forward run and fast rewind must be as small as possible to achieve a drive with compact energy sources and motors as small as possible. Furthermore, an easy operation and change-over to the different modes of operation must be possible.

A driving unit is known wherein the motor is arranged in the miniature dictating machine in such a manner that the motor shaft is disposed perpendicularly to the rewind and forward wind shafts. In said known unit a pivotably mounted intermediate shaft arranged substantially parallel to the motor shaft is driven by a driving belt, which intermediate shaft is provided at either end with driven wheels. When the intermediate shaft is moved into a first position, the first drive wheel drives a driving wheel secured e.g. to the forward winding shaft. When the intermediate shaft is moved into its second position the second drive wheel drives a driving wheel secured to the rewind shaft and thus drives the rewind shaft. The first drive wheel is then in an idle position in which the forward winding shaft is out of action. Disadvantages of this arrangement are especially seen therein that the driving wheel on the intermediate shaft extending perpendicularly and between forward winding shaft and rewind shaft makes the apparatus relatively thick substantially due to the addition of the thickness of the tape cartridge and diameter of the driving wheel.

SUMMARY OF THE INVENTION

It is, therefore, an object of the invention to provide a driving system for miniature dictating machines wherein the total dimensions of the miniature dictating apparatus are as small as possible and which allows small starting torques, good synchronism properties and an easy operation so that small total dimensions are achieved and, at the same time, low current consumption and high efficiency.

This problem is solved providing an intermediate shaft positioned parallel to the rewind shaft and to the forward winding shaft and adapted to be driven by a motor. The intermediate shaft is mounted parallel displaceable and is adapted to be fixed in at least one forward running position and one rewind position. By means of the intermediate shaft in the forward running position only the forward winding shaft and in the rewind position only the rewind shaft may be driven.

In a preferred embodiment an intermediate wheel with a resilient friction coating is provided which, under additional servo-effect, may be pressed between the intermediate shaft in forward running position and the forward winding shaft for non-positive drive of the forward winding shaft and for the reversal of the direction of rotation. For arresting the intermediate shaft in its forward running position, a stop and a pivotable lever are provided which prevent the intermediate shaft from being displaced by the servo force thereby weakening the servo force. The intermediate shaft is driven by the motor preferably over a driving belt which ascents on a belt wheel seated on the intermediate shaft and designed as a flywheel whereby the synchronism properties of the miniature dictating apparatus are improved.

On the rewind shaft and on the forward winding shaft a driving wheel is provided. The power transmission from the intermediate shaft is effected non-positively by said driving wheels. The driving wheel of the rewind shaft is preferably a toothed wheel, and the intermediate shaft is provided at the same height with a toothed wheel which engages, in the rewind position, the toothed wheel of the rewind shaft. The rewind position of the intermediate shaft is preferably defined by a stop. The position of the stop is so dimensioned that the toothed wheel of the intermediate shaft in the rewind position engages the driving wheel of the rewind shaft only sufficiently to avoid radial forces being exerted on the intermediate shaft and the rewind shaft.

A further embodiment is characterized in that an intermediate wheel may be moved from the non-positive position between the intermediate shaft and the forward winding shaft into a stop position so that the drive of the forward winding shaft may be interrupted.

A further embodiment is characterized in that the intermediate wheel is seated on a fixed, non-pivotable axis and that the intermediate shaft between the forward running position and the rewind position has a stop position in which neither the rewind shaft nor the intermediate wheel and thus the forward winding shaft are driven.

The advantages of the invention are especially seen therein that the driving unit of the invention is much more compact in comprison with known arrangement, it is defined substantially only by the dimensions of the motor and allows a handy width of the apparatus, that the direction of rotation of the motor need not be switched over, that the intermediate shaft has a flywheel mass, and that an intermediate wheel with a resilient friction coating is provided which effects in the forward running position, by servo effect, a safe power transmission from the intermediate shaft to the forward winding shaft and allows reversal of the direction of rotation. Without utilizng said servo effect, higher pressure forces and bearing loads would be produced which would require higher motor powers and energy sources.

Due to the servo effect, the force by which the intermediate wheel in the stop position lies against the intermediate shaft and the forward winding shaft can be maintained so low that the resilient coating of the intermediate wheel is not permanently deformed.

BRIEF DESCRIPTION OF THE DRAWINGS

The features of this invention as well as its method of operation will become more apparent from the following detailed description, attached claims and accompanying drawings, in which like characters refer to like parts, and in which:

DETAILED DESCRIPTION OF THE INVENTION

Figure 1:
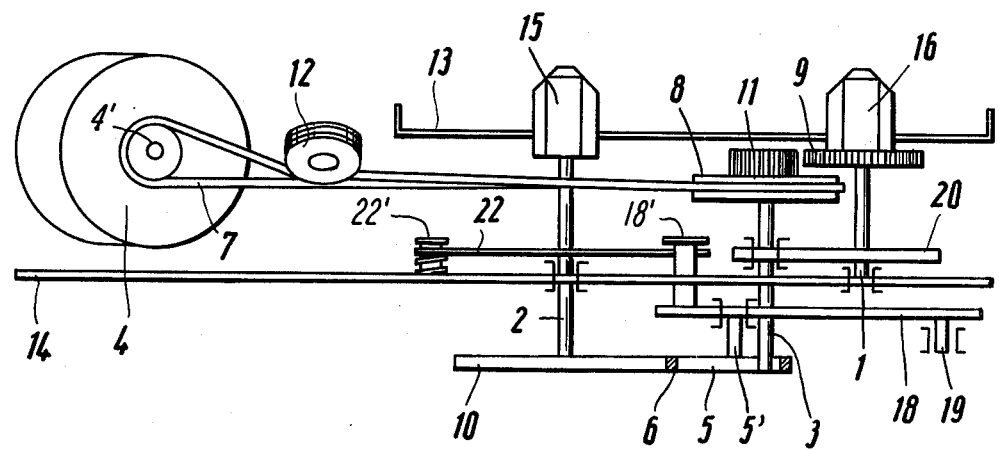
FIG. 1 is a side view of a driving unit according to the invention representing the operation "forward run"

FIG. 1 is a side view of a preferred embodiment of the driving unit according to the invention. A rewind shaft 1 and a forward winding shaft 2 are mounted in the lower plate 14. At the upper ends of the rewind shaft and the forward winding shaft tape windings 16 and 15 are provided for receiving suitable tape cassettes. An intermediate shaft 3 extends parallel to the forward winding shaft and the rewind shaft and is mounted for pivotal motion on a lever 20. The lever 20 is L-shaped and is pivotally supported on a pin 21 suitably secured to the lower plate 14. The intermediate shaft 3 is provided at its upper end with a driving belt wheel 8 which may be a flywheel with a corresponding mass. A driving belt 7 runs over the driving belt wheel 8, and is rotated by the motor shaft shaft 4' of the motor 4 over a wheel 12. The motor shaft of the motor 4 is arranged in a plane substantially perpendicular to the rewind and forward winding shafts. For reasons of space saving it may be advantageous to turn the motor slightly out of the plane extending perpendicularly to the rewind and forward winding shafts. The wheel 12 is arranged in such a manner that the driving belt 7 runs upon the driving belt wheel 8 without any substantial axial force components. This ensures that the driving belt remains safely on the toothed driving belt wheel. A driving wheel 9 is seated on the rewind shaft 1. A driving wheel 10 is provided on the forward winding shaft 2, preferably on the shaft end opposite the tape winding 15. The intermediate shaft 3 is provided, on the same level as the driving wheel 9, with a driving wheel 11 which is preferably a toothed wheel like the driving wheel 9. Between the intermediate shaft 3 and the driving wheel 10 of the forward running shaft 2 an intermediate wheel 5 with a resilient coating 6 is provided at the same level as the driving wheel 10. The intermediate wheel 5 has a shaft 5' mounted on a pivoted lever 18, which is pivotably mounted about a bearing 19. The swinging movement of the intermediate wheel 5 mounted on the lever 18 is effected preferably against a tension spring 22, one end of which is pressing against an upstanding element 18' supported on the end of the lever 18. The other end of the spring 22 is fixed to a pin 22' secured to the lower plate 14 such that the spring is pressed against the forward winding shaft 2. Parallel to the lower plate 14 an upper plate 13 is provided having recesses for the passage of the tape windings 15 and 16 and being secured at the level of the tape windings.

Figure 2:
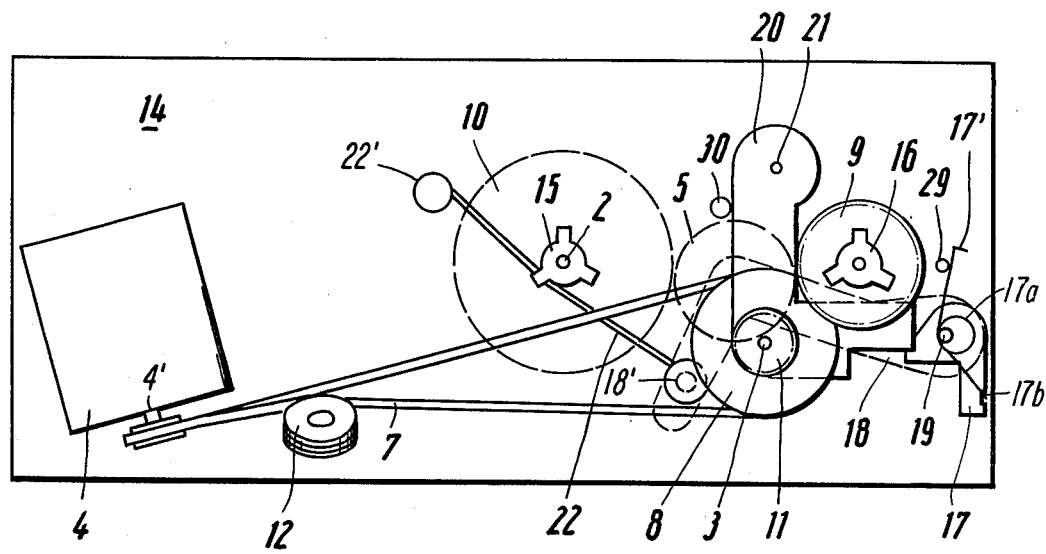
FIG. 2 is a top view of the driving unit illustrated in FIG. 1.

FIG. 2 is a plan view of the embodiment represented in FIG. 1. To make the illustration clearer, the upper plate 13 and some of the other structural elements of the driving unit have been omitted. The intermediate wheel 5 is in contact with the intermediate shaft 3 and the driving wheel 10 of the forward winding shaft 2. The direction of rotation of the intermediate shaft 3 is such that when the requirement of torque at the driving wheel 10 is increased, the rotating intermediate wheel 5 is further pulled by the servo effect of a corresponding power component into the narrowing intermediate space between intermediate shaft 3 and driving wheel 10. Due to this servo effect, the tension spring 22 need only exert a relatively small pressure on the element 18' to effect driving engagement between the driving wheel 10 and the intermediate shaft 3. Due to this relatively small pressure, marks otherwise produced in the resilient rubber coating 6 by contact with the intermediate shaft 3 and the driving wheel 10 are substantially avoided at standstill, which would otherwise cause flutters during the forward run. The pivotal motion of the lever 20 is determined by the stops 29 and 30 and the cooperative functioning of the pivoted lever 17. As can be more clearly seen from FIGS. 2 and 3, the lever 17 is pivotally supported on a shaft 17a, which may be coaxial with the bearing 19. A spring 17' is bent around the shaft 17a, with one end engaging a notch 17b provided in the lever 17, and the other end biased against the stop 29. In the position stop/forward run and fast forward run the pivoted lever 20 is arrested by the stop 30 and the pivotable lever 17 to limit movement of the intermediate wheel 5. Otherwise the intermediate wheel 5 would press the intermediate shaft 3 towards the rewind shaft 1 due to the servo effect. The lever 17 is pivoted against the spring 17' in the rewind position.

The position "fast forward run" is caused by switching the motor 4 electrically in a state of increased speed. The driving unit, particularly the pivotable intermediate shaft 3 and the pivotable intermediate wheel 5 take the positions defined by the operation "forward run" shown in FIG. 1.

Figure 3:
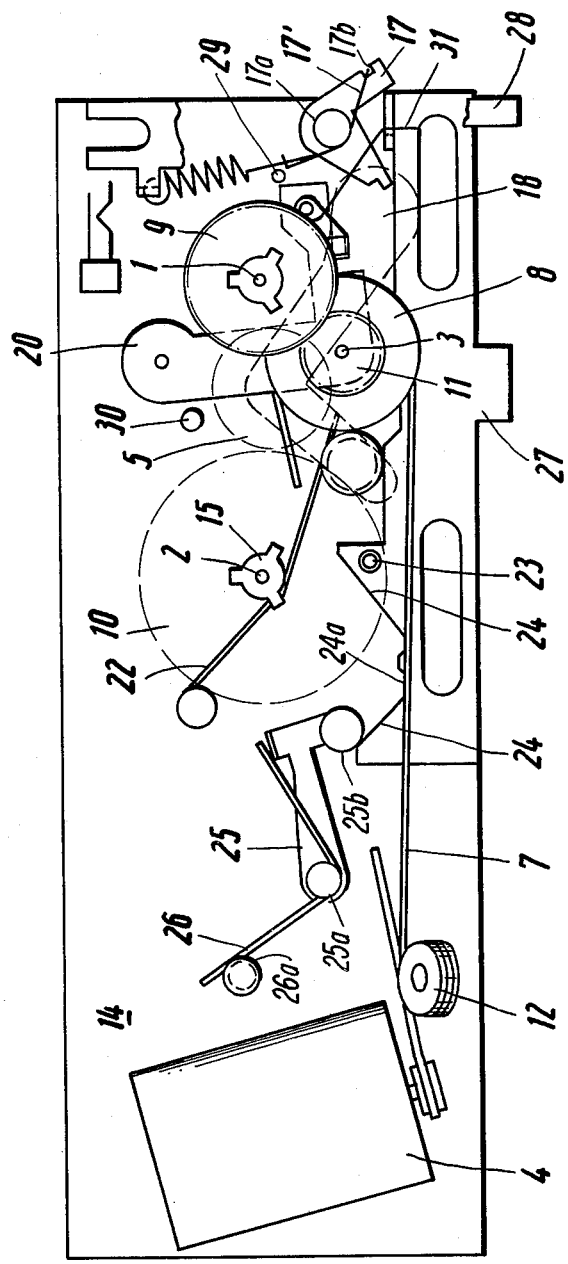
FIG. 3 is a top view of the driving unit according to the invention representing the operation "fast rewind".

FIG. 3 illustrates another top view of the driving unit, with the upper plate 13 being removed but with additional structure being shown. It shows the means by which the different operational modes of the driving unit are achieved. More particularly shown is the operation "fast rewind" wherein the toothed wheel 11 engages the driving wheel 9 of the rewind shaft 1. The slider 27 or actuating member is slidably supported and is movable to permit selection of the operational modes of the driving unit. Attached to, such as at the left end, and movable with the slider 27 are a pair of cams 24, each having a straight, slanted surface. The cams 24 are positioned so that the slanted surfaces are directed towards each other, with a space 24a therebetween. A pin 23 is disposed on one of the cams, with the pin controlling the electrical connection for the motor 4 and the amplifier (not shown).

The other end of the slider 27 is connected to the free end of the pivoted lever 20 by a biasing spring 31, so that movement of the slider controls pivoting of the lever.

A lever 25 is rotatably supported at one end of a pin 25a, and the free end is provided with an engagement member 25b which makes contact with the cams 24. A spring 26 is bent around the pin 25a, and the ends of the spring are forced against the free end of the lever 25 and a stop 26a. In this manner, the engagement member 25b, biased by the spring 26 against the cam 24, urges the slider 27 back to the left, as seen in FIG. 3, to terminate the "fast rewind" operation. Similarly, with the actuator 27 pushed to the left for "fast forward", the engagement member 25b contacts the other cam 24 and the actuator 27 is urged to the right to terminate the "fast forward" operation. It is understood that these "fast" mode operations would be held against the force of the spring 26 and the lever 25. With the engagement member 25b disposed in the space 24a between the cams 24, the "stop" and "forward run" operations are achieved, with detents to determine these positions, such as with a detent for "forward run" disposed to the right of the detent for "stop".

The operation "fast rewind" is achieved by moving the slider 27 to the right, causing the pivoted lever 20, biased by the spring 31, to press at first against the lever 17. When the slider 27 is moved further, the end of the slider engages the lever 17, causing the lever to pivot and release the pivoted lever 20 so that the biased spring 31 can move the pivoted lever 20, permitting the toothed wheels 9 and 11 to engage. The swinging movement of the lever 20 carrying the intermediate shaft 3 is limited by the stop 29 so that in the rewind position the toothed wheel 11 of the intermediate shaft engages the driving wheel 9 of the rewind shaft only so much so that no radial forces act upon the intermediate shaft 3 and the rewind shaft 1.

By action of the cams 24 of the actuating member 27 together with the lever 25, the spring 26 and the engagement member 25b, the automatic reset of the actuating member 27 from the positions "fast forward" and "fast rewind" is achieved and the positions "stop" and "forward run" are locked in, as described above.

The pin 23 on the cam 24 of the actuating member 27 controls contacts (not shown) which effect the electric switching of the motor and amplifier in the different operations "forward run" is, "fast forward run", "fast rewind" and "stop". Only in case of "forward run" the amplifier switched-in, otherwise it is currentless. Furthermore, an operating key 28 may be provided by means of which the playback or recording operation of the apparatus can be adjusted, and also by means of which the operation "slow forward run for recording" can be adjusted against a reset force, although the apparatus is in the stop position effected by the actuating member 27.

The mode of operation of the driving unit is as follows:

In the rewind position the intermediate shaft 3 has a small distance from the rewind shaft 1, the driving wheel 9 on the rewind shaft is driven by the toothed wheel 11 on the intermediate shaft. When the actuating member 27 is shifted to the left into the forward run position, the toothed wheels 9 and 11 are no longer engaged, and the distance between the intermediate shaft 3 and the rewind shaft 1 is increased. By shifting the actuating member 27 into the forward run position, the pivoted lever 18 is moved by the spring 22 such that the intermediate wheel 5 is pressed into the gap between intermediate shaft 3 and driving wheel 10 on the forward winding shaft 2. By means of the intermediate wheel 5 and the driving wheel 10 the forward winding shaft 2 is driven. By the intermediate wheel 5 the direction of rotation is also reversed. When the actuating member 27 is moved to the right into the stop position, the intermediate shaft 3 remains in the position defined by the forward running position. In the stop position, the contacts actuated by the pin 23 disconnect the motor and amplifier to stop the use of electric energy.

In order to also reduce the energy consumption in the other mode of operation, the rewind of the tape is effected by the disclosed gear transmission which avoids radial forces on the axes. If for reasons of achieving the necessary high synchronism a gearwheel drive of the forward winding shaft cannot be realized care has been taken that the intermediate wheel 5 is rotated in such a direction that the intermediate wheel 5 is pulled into the space between driving wheel 10 and intermediate shaft 3 due to the servo effect caused by the rotation so that the radial forces exerted on the shafts in the stop position are maintained relatively low. Low radial forces on the shafts are necessary in order to maintain the frictional forces of the driving unit, and thus the magnitude of the necessary energy sources, as low as possible.

In another embodiment the intermediate wheel 5 in the stop position is free, e.g. by another cam provided on the actuating member 27, and is not in contact with the forward winding shaft 2 or the intermediate shaft 3.

What is claimed is:

1. A driving system for a miniature dictating apparatus comprising:
   a forward winding means disposed on a first rotatable shaft and a rewinding means disposed on a second rotatable shaft, both winding means adapted for receiving tape windings;
   a motor having a drive shaft, said drive shaft being disposed in a plane substantially perpendicular to the axes of said first and second shafts;
   a rotatable shaft operatively connected to said motor and disposed substantially parallel to and intermediate said first and second shafts, said rotatable shaft displaceable to a first position to drivingly engage said first shaft and a second position to drivingly engage said second shaft;
   a wheel rotatably supported and disposed between said rotatable shaft and said first shaft, said wheel having a resilient friction element on the periphery and displaceable to a position of driving engagement with said first shaft and said rotatable shaft when said rotatable shaft is in said first position; and
   control means for regulating the position of said rotatable shaft and said wheel.

2. The driving system of claim 1, further comprising a pivotable lever for movably supporting said rotatable shaft between said first and second positions.

3. The driving system of claim 1, further comprising pivotable means for supporting said wheel and biasing means adapted for biasing said wheel in driving engagement with said first shaft.

4. The driving system of claim 1, further comprising a stop means and a second pivotable lever for arresting said rotatable shaft in said first position.

5. The driving system of claim 1, further comprising second stop means for limiting movement of said rotatable shaft into said second position.

6. The driving system of claim 5, wherein said stop means is positioned to control the engagement between said rotatable shaft and said second shaft such that no radial forces are exerted on said shafts.

7. The driving system of claim 1, wherein said wheel is adapted to be moved from said position of driving engagement with said first shaft and said rotatable shaft to a stop position to disconnect driving engagement with said first shaft.

8. The driving system of claim 1, wherein said rotatable shaft supports a belt wheel and is operatively connected to said motor by a flexible drive means coupled to said drive shaft and said belt wheel.

9. The driving system of claim 8, further including a deflecting wheel positioned for directing said flexible drive means into a plane perpendicular to the axis of said rotatable shaft.

10. The driving system of claim 1, wherein said first and said shafts are each provided with a driving wheel, and rotation of each of said shafts is non-positively effected between said rotatable shaft and the driving wheel on each of said shafts.

11. The driving system of claim 10, wherein the driving wheel of said second shaft is disposed in a plane parallel to the plane of the driving wheel of said first shaft.

12. The driving system of claim 11, wherein the driving wheel of said second shaft is a toothed wheel, and a second toothed wheel is provided on said rotatable shaft for engagement with the driving wheel of said second shaft, both of said toothed wheels being coplanar.

13. The driving system of claim 1, wherein said wheel is supported on a fixed, non-pivotable axis, and said rotatable shaft has a stop position between said first and said second positions in which neither of said first nor said second shafts are engaged.

* * * * *

UNITED STATES PATENT AND TRADEMARK OFFICE
CERTIFICATE OF CORRECTION

PATENT NO. : 4,079,900
DATED : March 21, 1978
INVENTOR(S) : Karl Weis

It is certified that error appears in the above-identified patent and that said Letters Patent are hereby corrected as shown below:

In the Abstract, lines 8 and 9, delete "rewinding shaft" and insert --shafts of the rewinding means--.

line 9, after "winding" insert --means--.

Column 2, line 45, delete "comprison" and insert --comparison--.

Column 5, line 28, delete "is".

line 29, after "run" insert --is--.

line 34, delete "slow".

Claim 10, line 2, after "said" insert --second--.

Signed and Sealed this

Eighth Day of August 1978

[SEAL]

Attest:

RUTH C. MASON
Attesting Officer

DONALD W. BANNER
Commissioner of Patents and Trademarks